April 20, 1948.   E. K. CLARK   2,439,923
GASKET
Filed Oct. 21, 1943

WITNESSES:
James F. Young

INVENTOR
Earl K. Clark.
BY
Paul C. Friedemann
ATTORNEY

Patented Apr. 20, 1948

2,439,923

UNITED STATES PATENT OFFICE 2,439,923

GASKET

Earl K. Clark, Mansfield, Ohio, assignor to Westinghouse Electric Corporation, East Pittsburgh, Pa., a corporation of Pennsylvania Application October 21, 1943, Serial No. 507,124

4 Claims. (Cl. 288—23)

My invention relates to improvements in apparatus used in conjunction with bombs or projectiles that are to be photoelectrically or electronically exploded and, more particularly, relates to gasket of special construction.

In projectiles that are to be exploded electrically, a battery compartment is disposed below an amplifier compartment. A group of terminals from the amplifier compartment extend into a terminal receiving plate. It is important that in the assembly of the units a liquid-tight seal is provided, that proper circuit connections are made and that the sealing means do not interfere with the assembly of other elements.

One object of my invention is the provision of a sealing gasket between two facing plates and a surrounding housing contacting the perimeters of both plates.

Other objects and advantages will become more apparent from a study of the following specification and the accompanying drawing, in which.

The gasket G is circular and in the shape of a ring and consists essentially of three parts, an inner channeled part 1, an outer channeled part 2, and an intermediate flat part 3. The inner part has a given axial depth from the top plane P normal to the gasket axis to the lower plane P' parallel to plane P. In an actual bomb under construction, this depth when the gasket is unstressed is .16 inch.

The outer channeled part 2 has a lesser depth than the inner part. The inner and outer parts are joined by the flat part 3. The flat part has its upper flat surface falling in plane P, but the outer part is so connected and integrally formed with the rest of the gasket that its crest or lowermost region falls above plane P' and that uppermost region at its edge portion 5 falls below plane P. The thickness of the gasket is substantially uniform throughout except for the portion from the crest of channeled part 2 to the outermost circumference of edge portion 5. The thickness of this latter portion decreases to slightly greater than half the general thickness of the gasket.

Figure 6:
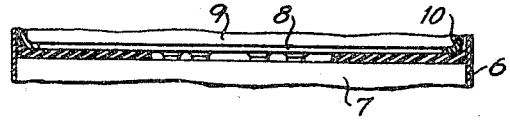

The gasket in its final position is in the shape shown in Fig. 6 and thus provides a seal between the fuse can 6, the terminal receiving block 7 or the batteries forming part of this weapon and the lower portion 8 of the terminal plate 9 of the amplifier housing.

Figure 1:
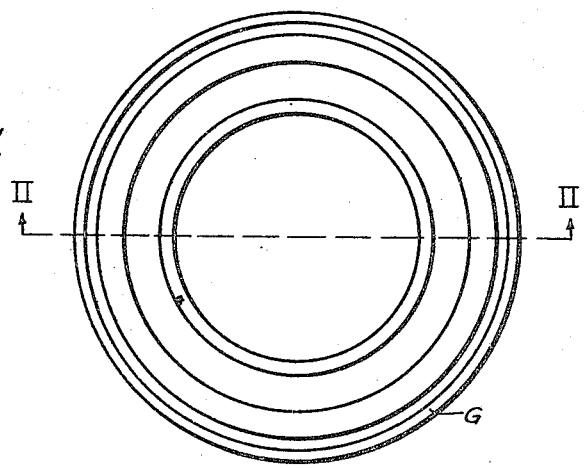
Figure 1 is a plan view of my novel gasket.
Figure 2:
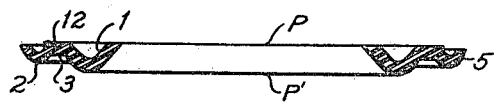
Fig. 2 is a sectional view of the gasket taken on section line II—II of Fig. 1 looking in the direction indicated by the arrows at the end of the section line.
Figure 3:
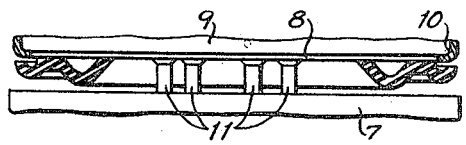
Figs. 3, 4, 5, and 6 show four stages in the assembly of the elements with which my gasket coacts.
Figure 4:
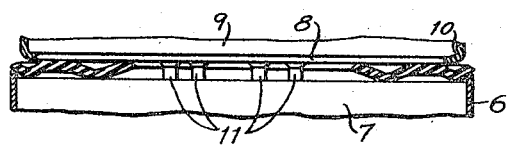
Figure 5:
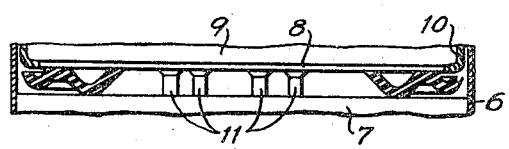

In the type of weapon under consideration, it is important that suitable connection be made between the amplifier and the batteries which are respectively disposed in housings 6 and 10. The first function of this gasket member, that of providing a minimum pressure seating the components against the bottom of their container, is provided by both the inner and outer channel members. The greatest percentage of this longitudinal pressure, namely, the pressure in the direction of the gasket axis, is provided by the outer panel member or part when all the parts are assembled, and the gasket is confined laterally by the inside surface of the container or can 6, as shown in Fig. 6. A battery member or terminal receiving block 7, however, is placed against the terminal plate comprising elements 8 and 9, and the terminals 11 engage prior to the complete assembly of the unit, as shown in Fig. 3, where the terminals 11 have already entered the block 7 ahead of the appearance of the container edges housing the battery as the container 6 is moved vertically with reference to the amplifier housing 10. In this operation, it is very probable that the battery will be pushed against the gasket with sufficient pressure that the outside part as 2 will be extended radially beyond the diameter of the lower container 6, as shown in Fig. 4, thus preventing the container 6 from being slipped into place. To prevent this from happening, the inner channel member which is higher than the outer channel member is effective earlier in the assembly operation, that is, during the movement of blocks 7 towards plate 8 and is deformed and moved radially inwardly through a greater distance or longer range. The inner channeled part thus provides a sufficient force in the axial direction to move the battery on the contact pins or terminals 7, that is, move the terminal block 7 sufficiently so that the parts hold the position shown in Fig. 5. The outermost circumference of the outer channeled part is thus retracted radially inwardly a sufficient amount as to permit the upper edge of container 6 to move over the amplifier housing 10. In other words, the gasket G is made self-correcting in the sense that it will position the batteries and the terminal block for the batteries properly to permit assembly of the two containers 6 and 10, even though the operator may carelessly during assembly push it to a position where the can 6 could not be placed on the amplifier housing 10.

The second purpose of my gasket is that of providing a moisture-tight seal against the inside surface of the container 6 after the assembly has been completed. As hereinabove explained, the gasket is self-restorative to permit assembly, but after the can or container 6 has been placed over the outside diameter of the gasket, further compression by means of the threaded engagement between the amplifier housing 10 and the container 6, not shown, will compress both channeled parts 1 and 2, and in so compressing the gasket, the edge portion 5 of the outer channeled part will move radially outwardly to firmly engage the inside surface of the container 6, thus forming a moisture-tight seal. It is during this cycle or stage of assembly where the outer flange is partly confined and the longitudinal pressure of this outer flange combined with that of the inner flange will properly seat the battery and switch components against the bottom of the container 6. It is important that the elements contained in the conainer 6 be firmly seated at the bottom of the container when assembled because in use, these units are subjected to an average acceleration in the direction of the nose of the fuse of approximately 500 times the force of gravity, and it is important that no movement take place between these members during the time that this accelerating force is applied.

I have thus provided a gasket of extremely low cost, one that may be easily assembled and provides both an initial compression for properly positioning the components 6, 7, and 8 relative to each other and provides for a moisture-tight seal preventing any moisture from getting into the battery compartment, that is, container 6, or the amplifier compartment 10. Furthermore, this type of resilient member completely eliminates the possibility of microphonics during periods of severe acceleration which could be present if a metallic resilient member were used in place of my gasket. Furthermore, a metallic member while probably properly positioning the elements would provide no water-tight seal, which sealing effect has to be accomplished by some other means.

During the assembly, the flat portion 12, or for that matter the matching annular region on the plate 8, is provided with a suitable adhesive and a gasket is positioned against the plate 8, as shown in Fig. 3. No special means are thus needed to hold the gasket in proper position during the assembly of containers 6 and 10. Both the inner and outer channeled parts 1 and 2 are in this way left free for the desired displacement or deformation thereof which occurs during assembly of the apparatus, as just explained.

The feathering or thinning of the outer edge portion 5 effectively helps to provide the necessary seal since the material is not bulky in this region and is thus not likely to form any folds.

While I have shown a gasket having a particular shape, I do not wish to be limited to the exact details shown nor the dimensions mentioned, but wish to be limited only by the scope of the claims hereto appended.

I claim as my invention:

1. In a gasket adapted for association with a device having a pair of flat members slidably disposed in facing relation within a cylindrical member, a flexible ring-like body comprising inner and outer concentric U-shaped portions joined by an annular flattened portion, said inner U-shaped portion being of greater depth than that of said outer U-shaped portion, and adhesive means for securing said intermediate annular flattened portion of the gasket to one of said flat members whereby upon assembly of said elements said U-shaped portions of the gasket are free for expansion, said outer U-shaped portion being expandible into sealing relationship with all three of said members.

2. An annular flexible gasket made of resilient non-metallic material comprising an outer annular V-shaped portion having a shortened and tapered outer wall, an annular flat portion extending inwardly from the inner wall of said V-shaped portion, and an inner annular V-shaped portion of greater depth than that of said outer V-shaped portion and extending inwardly from said flat portion, said outer V-shaped portion being thereby disposed between a plane at the annular crest of said outer V-shaped portion and a plane common to the innermost edge thereof and the outer face of said flat portion of the gasket.

3. An annular rubber-like gasket having a sectional shape substantially in the form of the number three, comprising an inner annular V-shaped portion having an outer wall terminating in an annular flat portion in a plane normal to the axis of the gasket, and a somewhat smaller annular V-shaped portion extending outwardly from said flat portion within the outside dimensions of the first mentioned V-shaped portion, said gasket being yieldable to permit deformation of said V-shaped portions into the plane of said flat portion under pressure applied to opposite faces of said gasket, said inner V-shaped portion being adapted to offer a predetermined resistance to the deforming pressure prior to initial deformation of said smaller V-shaped portion.

4. An annular rubber-like gasket having a sectional shape substantially in the form of the number three, comprising an inner annular V-shaped portion having an outer wall terminating in an annular flat portion in a plane normal to the axis of the gasket, and a somewhat smaller annular V-shaped portion extending outwardly from said flat portion within the outside dimensions of the first mentioned V-shaped portion, said gasket being yieldable to permit deformation of said V-shaped portions into the plane of said flat portion under pressure applied to opposite faces of said gasket, said inner V-shaped portion being adapted to offer a predetermined resistance to the deforming pressure prior to initial deformation of said smaller V-shaped portion, and the last-mentioned V-shaped portion having an annular margin of reduced thickness which is uniformly expansive outwardly under the final deforming pressure.

EARL K. CLARK.

REFERENCES CITED

The following references are of record in the file of this patent:

UNITED STATES PATENTS

| Number | Name | Date |
|---|---|---|
| 458,026 | Walker | Aug. 18, 1891 |
| 480,643 | Welsh | Aug. 9, 1892 |
| 843,394 | Haynes | Feb. 5, 1907 |
| 1,313,129 | Smith | Aug. 12, 1919 |
| 1,336,828 | Edwards | Apr. 13, 1920 |
| 1,516,397 | Mueller | Nov. 18, 1924 |
| 1,721,326 | Wilson | July 16, 1929 |